(12) United States Patent
Hanawa et al.

(10) Patent No.: US 12,434,456 B2
(45) Date of Patent: *Oct. 7, 2025

(54) LAMINATED MEMBER

(71) Applicant: AGC Inc., Tokyo (JP)

(72) Inventors: Yu Hanawa, Tokyo (JP); Shuhei Ogawa, Tokyo (JP); Seiji Inaba, Tokyo (JP); Hiroyuki Yamamoto, Tokyo (JP)

(73) Assignee: AGC Inc., Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 18/063,138

(22) Filed: Dec. 8, 2022

(65) Prior Publication Data
US 2023/0107722 A1    Apr. 6, 2023

Related U.S. Application Data

(63) Continuation of application No. PCT/JP2021/021106, filed on Jun. 2, 2021.

(30) Foreign Application Priority Data

Jun. 10, 2020 (JP) ................. 2020-101051
Sep. 25, 2020 (JP) ................. 2020-161312
Jan. 20, 2021 (JP) ................. 2021-007287

(51) Int. Cl.
*B32B 17/06* (2006.01)
*B32B 7/12* (2006.01)
(Continued)

(52) U.S. Cl.
CPC .............. *B32B 17/06* (2013.01); *B32B 7/12* (2013.01); *B32B 18/00* (2013.01); *B32B 37/12* (2013.01);
(Continued)

(58) Field of Classification Search
CPC .......... B32B 17/06; B32B 17/10; B32B 7/12; B32B 9/045; B32B 18/00; B32B 2250/03;
(Continued)

(56) References Cited

U.S. PATENT DOCUMENTS

2004/0183232 A1*  9/2004  Kinoshita ............... C04B 35/64
                                                        264/332
2008/0174054 A1   7/2008  Lipson et al.
(Continued)

FOREIGN PATENT DOCUMENTS

CN    107270755    10/2017
JP    08-083835    3/1996
(Continued)

OTHER PUBLICATIONS

International Search Report issued Jul. 6, 2021 in PCT/JP2021/021105 filed Jun. 2, 2021, 2 pages.
(Continued)

*Primary Examiner* — Joanna Pleszczynska
(74) *Attorney, Agent, or Firm* — Oblon, McClelland, Maier &Neustadt, L.L.P.

(57) ABSTRACT

The present invention relates to a laminated member including: a glass member having a linear transmittance at a wavelength of 850 nm of 80% or more; a bonding layer including a resin and lying on the glass member; and a Si—SiC member lying on the bonding member, in which the Si—SiC member has an average linear expansion coefficient α at from 20° C. to 200° C. of from 2.85 ppm/° C. to 4.00 ppm/° C.

20 Claims, 1 Drawing Sheet

(51) Int. Cl.
  *B32B 9/04* (2006.01)
  *B32B 17/10* (2006.01)
  *B32B 18/00* (2006.01)
  *B32B 37/12* (2006.01)
  *B32B 37/20* (2006.01)
  *C04B 35/565* (2006.01)

(52) U.S. Cl.
  CPC .......... *B32B 37/20* (2013.01); *B32B 2250/03* (2013.01); *B32B 2307/302* (2013.01); *B32B 2307/308* (2013.01); *B32B 2307/412* (2013.01); *B32B 2315/02* (2013.01); *B32B 2315/08* (2013.01)

(58) Field of Classification Search
  CPC ........ B32B 2307/302; B32B 2307/308; B32B 2315/02; B32B 2315/08; C04B 35/565; H05B 6/12; F24C 15/10
  See application file for complete search history.

(56) References Cited

U.S. PATENT DOCUMENTS

| | | | |
|---|---|---|---|
| 2010/0128242 A1 | 5/2010 | Lipson et al. | |
| 2013/0288876 A1 | 10/2013 | Fujisawa et al. | |
| 2017/0157891 A1 | 6/2017 | Soda et al. | |
| 2018/0082914 A1* | 3/2018 | Hanawa | H01L 23/15 |
| 2018/0305241 A1* | 10/2018 | Sawamura | H01L 24/96 |
| 2022/0134713 A1 | 5/2022 | Ogawa et al. | |

FOREIGN PATENT DOCUMENTS

| | | |
|---|---|---|
| JP | 11-100229 A | 4/1999 |
| JP | 2005-86711 A | 3/2005 |
| JP | 2008-199006 A | 8/2008 |
| JP | 2012-148958 A | 8/2012 |
| JP | 2013-197425 | 9/2013 |
| JP | 2014-165459 A | 9/2014 |
| JP | 2018-203571 A | 12/2018 |
| WO | WO 2015/087812 A1 | 6/2015 |
| WO | WO 2021/015059 A1 | 1/2021 |

OTHER PUBLICATIONS

International Search Report issued Aug. 17, 2021 in PCT/JP2021/021106 filed Jun. 2, 2021, 3 pages.

* cited by examiner

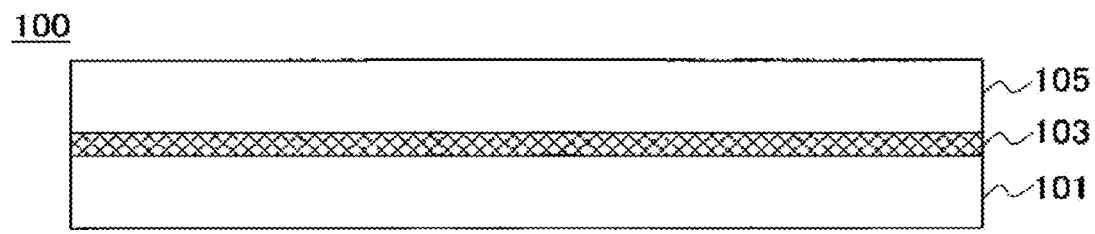

LAMINATED MEMBER

CROSS-REFERENCE TO RELATED APPLICATIONS

This is a continuation of International Application No. PCT/JP2021/021106 filed on Jun. 2, 2021, and claims priority from Japanese Patent Applications No. 2020-101051 filed on Jun. 10, 2020, Japanese Patent Applications No. 2020-161312 filed on Sep. 25, 2020, and Japanese Patent Applications No. 2021-007287 filed on Jan. 20, 2021, the entire content of which is incorporated herein by reference.

TECHNICAL FIELD

The present invention relates to a laminated member.

BACKGROUND ART

In a system kitchen, a work table, a heat cooking device, and the like are connected by a worktop. Stainless steel, artificial marble, ceramics, and the like are used as a material of the worktop.

The heat cooking device is built into an opening included in the worktop. The heat cooking device includes a top plate on which an object to be heated (a pot and the like) is placed. Crystallized glass (see Patent Literature 1), ceramics, and the like are used as a material of the top plate.

CITATION LIST

Patent Literature

Patent Literature 1: JP2012-148958A

SUMMARY OF INVENTION

Technical Problem

In recent years, in terms of design of the system kitchen, the worktop and the top plate are desired to be made of the same material. Therefore, application of a heating member used for the top plate of the heat cooking device to the worktop has been studied.

Here, the heating member used for the top plate is required to have excellent temperature rise property and an excellent impact resistance. The inventors of the present invention have evaluated a laminated member including a glass member, a bonding layer including resin, and a Si—SiC member as heating members, and found that although the laminated member is excellent in the temperature rise property and the impact resistance, there is room for improvement a thermal impact resistance.

Therefore, an object of the present invention is to provide a laminated member that is excellent in temperature rise peoperty, an impact resistance, and a thermal impact resistance.

Solution to Problem

As a result of intensive studies on the above problem, the inventors of the present invention have found that a laminated member including a glass member having a predetermined linear transmittance, a bonding layer including a resin, and a Si—SiC member is excellent in temperature rise property, an impact resistance, and a thermal impact resistance in the case where an average linear expansion coefficient α of the above Si—SiC member is in a predetermined range, and completes the present invention.

[1] A laminated member including:
a glass member having a linear transmittance at a wavelength of 850 nm of 80% or more;
a bonding layer including a resin and lying on the glass member; and
a Si—SiC member lying on the bonding layer,
in which the Si—SiC member has an average linear expansion coefficient α at from 20° C. to 200° C. of from 2.85 ppm/° C. to 4.00 ppm/° C.

[2] The laminated member according to [1],
in which the glass member has an average linear expansion coefficient β at from 20° C. to 200° C. of from 1.50 ppm/° C. to 5.00 ppm/° C.

[3] The laminated member according to [1] or [2],
in which the glass member includes from 55.0 mol % to 85.0 mol % of $SiO_2$, from 1.5 mol % to 14.5 mol % of $Al_2O_3$, from 3.0 mol % to 14.0 mol % of $B_2O_3$, and from 0 mol % to 3.5 mol % of $P_2O_5$, as represented by mole percent based on oxides, and
has a total content of the $SiO_2$, the $Al_2O_3$, the $B_2O_3$, and the $P_2O_5$ of from 70.0% to 97.0% as represented by mole percent based on oxides.

[4] The laminated member according to [3],
in which the glass member has the content of the $B_2O_3$ of 8.5 mol % or less.

[5] The laminated member according to any one of [1] to [4],
in which the glass member includes from 0 mol % to 13.0 mol % of $Na_2O$ as represented by mole percent based on oxides.

[6] The laminated member according to any one of [1] to [5],
in which the glass member includes from 0.0001 mol % to 0.0115 mol % of $Fe_2O_3$ as represented by mole percent based on oxides.

[7] The laminated member according to any one of [1] to [6],
in which the glass member has the linear transmittance at the wavelength of 850 nm of 90% or more.

[8] The laminated member according to any one of [1] to [7],
in which the glass member has a thickness of from 2 mm to 40 mm, and the Si—SiC member has a thickness of from 0.5 mm to 15 mm.

[9] The laminated member according to any one of [1] to [8],
in which the Si—SiC member has a thermal conductivity at 20° C. of from 190 W/m·K to 300 W/m·K.

[10] The laminated member according to any one of [1] to [9], having an absolute value |α−β| of 2.00 ppm/° C. or less,
in which the absolute value |α−β| is a value obtained by subtracting the average linear expansion coefficient β of the glass member at from 20° C. to 200° C. from the average linear expansion coefficient α of the Si—SiC member at from 20° C. to 200° C.

[11] The laminated member according to any one of [1] to [10],
in which the Si—SiC member has a Young's modulus of from 300 GPa to 420 GPa.

[12] The laminated member according to any one of [1] to [11],
in which the Si—SiC has a content ratio of a metallic Si of from 8 mass % to 60 mass %.

[13] The laminated member according to any one of [1] to [12],
in which the resin has a heat resistance temperature of from 120° C. to 300° C.

[14] The laminated member according to any one of [1] to [13],
in which the bonding layer has an average linear expansion coefficient γ at from 20° C. to 200° C. of from 2 ppm/° C. to 200 ppm/° C.
[15] The laminated member according to any one of [1] to [14], having a density of from 2.40 g/cm$^3$ to 2.85 g/cm$^3$.
[16] The laminated member according to any one of [1] to [15], having an amount of bending of 0.25 mm or less.
[17] The laminated member according to any one of [1] to [16], further including:
a second bonding layer lying on the Si—SiC member; and
a second Si—SiC member bonded to the Si—SiC member via the second bonding layer.

Advantageous Effects of Invention

According to the present invention, the laminated member that is excellent in temperature rise property, an impact resistance, and a thermal impact resistance can be provided.

BRIEF DESCRIPTION OF DRAWINGS

The FIGURE is a cross-sectional view schematically showing a laminated member according to one embodiment of the present invention.

DESCRIPTION OF EMBODIMENTS

Terms used in the present invention have the following meanings.
A numerical range expressed by using "to" means a range including numerical values described before and after "to" as a lower limit value and an upper limit value.
[Laminated Member]
The laminated member of the present disclosure includes a glass member having a linear transmittance at a wavelength of 850 nm of 80% or more, a bonding layer including a resin and lying on the glass member, and a Si—SiC member lying on the bonding layer, in which the Si—SiC member has an average linear expansion coefficient α at from 20° C. to 200° C. of from 2.85 ppm/° C. to 4.00 ppm/° C.
The laminated member of the present disclosure is excellent in temperature rise property, an impact resistance, and a thermal impact resistance. Although details of this reason have not been clarified yet, it is presumed that the reason is generally as follows.
That is, it is presumed that by using the glass member having the linear transmittance at the wavelength of 850 nm of 80% or more, infrared rays sufficient for heating utilization are transmitted, and a temperature of the laminated member is raised at a high speed.
It is presumed that by including the bonding layer which includes the resin, the bonding layer functions as a cushioning material and the impact resistance is improved.
Since the average linear expansion coefficient α of the Si—SiC member is in the above range, a difference in an expansion coefficient from the bonding layer including the resin is small, and thus it is presumed that a generated stress is small and the thermal impact resistance is improved.
Hereinafter, a laminated member according to one embodiment of the present invention will be described with reference to the drawing.
The FIGURE is a cross-sectional view schematically showing the laminated member according to one embodiment of the present invention. The laminated member 100 includes a glass member 101, a bonding layer 103 disposed on the glass member 101, and a Si—SiC member 105 disposed on the bonding layer 103. The laminated member 100 has a laminated structure in which the glass member 101, the bonding layer 103, and the Si—SiC member 105 are laminated in this order.
[Si—SiC Member]
In one embodiment of the present invention, the Si—SiC member means a sintered member including a composite material containing silicon carbide (SiC) and silicon (Si) (metallic Si).
With respect to a total weight of the Si—SiC member, the Si—SiC member 105 is preferably a ceramic containing from 40 mass % to 92 mass % of SiC and from 8 mass % to 60 mass % of Si, more preferably a ceramic containing from 50 mass % to 87 mass % of SiC and from 13 mass % to 50 mass % of Si, further preferably a ceramic containing from 55 mass % to 82 mass % of SiC and from 18 mass % to 45 mass % of Si, particularly preferably a ceramic containing from 60 mass % to 77 mass % of SiC and from 23 mass % to 40 mass % of Si, and most preferably a ceramic containing from 65 mass % to 72 mass % of SiC and 28 mass % to 35 mass % of Si.
In the case where contents of Si and SiC of the Si—SiC member 105 are in the above range, the Si—SiC member 105 achieves an excellent balance between a thermal property and a mechanical property.
A composition of the Si—SiC member 105 is not particularly limited as long as Si and SiC are contained, and may include a component derived from a sintering aid, a tiny amount of impurities (such as Fe), and the like. The sintering aid is not particularly limited, and is, for example, BeO, $B_4C$, BN, Al, or AlN.
The thickness of the Si—SiC member 105 is preferably from 0.5 mm to 15 mm. The thickness of the Si—SiC member 105 is more preferably 1.5 mm or more, further preferably 2.0 mm or more, and particularly preferably 2.5 mm or more.
The thickness of the Si—SiC member 105 is more preferably 10.0 mm or less, further preferably 7.5 mm or less, and particularly preferably 5.5 mm or less.
Since the Si—SiC member 105 is supported by the glass member 101, the thickness can be reduced. Since the thickness of the Si—SiC member 105 can be reduced, a temperature can be raised and lowered quickly.
The thickness of the Si—SiC member 105 can be measured by, for example, a caliper and a digital measure.
The average linear expansion coefficient α of the Si—SiC member 105 at from 20° C. to 200° C. is from 2.85 ppm/° C. to 4.00 ppm/° C. Hereinafter, the average linear expansion coefficient α of the Si—SiC member 105 at from 20° C. to 200° C. is also simply referred to as an average linear expansion coefficient α.
The average linear expansion coefficient α is preferably 2.90 ppm/° C. or more, more preferably 2.95 ppm/° C. or more, and particularly preferably 3.00 ppm/° C. or more.
The average linear expansion coefficient α is preferably 3.40 ppm/° C. or less, more preferably 3.20 ppm/° C. or less, and particularly preferably 3.10 ppm/° C. or less.
In the case where the average linear expansion coefficient α of the Si—SiC member 105 is in the above range, the average linear expansion coefficient of the Si—SiC member 105 and an average linear expansion coefficient of the glass member 101 can be readily matched with each other. Since thermal conductivity and strength of the Si—SiC member 105 can be increased, the impact resistance can also be increased while increasing the speed of rising the temperature.

Above all, in the case where the average linear expansion coefficient α is from 3.00 ppm/°C. to 3.10 ppm/°C., the Si—SiC member achieves a more excellent balance between the thermal conductivity and the strength.

The average linear expansion coefficient α can be measured by a dilatometer whose temperature range to be measured is from 20°C. to 200°C., and a thermomechanical analyzer (TMA).

As a method for setting the average linear expansion coefficient α of the Si—SiC member 105 to the above range, a method for adjusting the contents of SiC and Si within the above range is exemplified.

The thermal conductivity of the Si—SiC member 105 at 20°C. is preferably from 130 W/m·K to 300 W/m·K.

The thermal conductivity of the Si—SiC member 105 at 20°C. is more preferably 190 W/m·K or more, further preferably 210 W/m·K or more, and particularly preferably 225 W/m·K or more.

The thermal conductivity of the Si—SiC member 105 at 20°C. is more preferably 270 W/m·K or less, further preferably 260 W/m·K or less, and particularly preferably 250 W/m·K or less.

In the case where the thermal conductivity of the Si—SiC member 105 is in the above range, heat uniformity is improved as the heating member. Furthermore, in the case where the thermal conductivity of the Si—SiC member 105 is in the above range, reduction in a yield due to variation in the thermal conductivity during production of the Si—SiC member 105 can be prevented, and quality of the Si—SiC member 105 can be stabilized readily.

The thermal conductivity can be measured by a laser flash method.

As a method for setting the thermal conductivity of the Si—SiC member 105 to the above range, a method for adjusting the contents of SiC and Si within the above range is exemplified.

The Young's modulus of the Si—SiC member 105 is preferably from 300 GPa to 420 GPa. The Young's modulus of the Si—SiC member 105 is more preferably 320 GPa or more, further preferably 350 GPa or more, and particularly preferably 370 GPa or more.

The Young's modulus of the Si—SiC member 105 is more preferably 410 GPa or less, further preferably 400 GPa or less, and particularly preferably 390 GPa or less.

The thermal impact resistance increases in accordance with a decrease in the Young's modulus. The Young's modulus of the Si—SiC member 105 satisfies the above range, and thus, the thermal impact resistance is improved, which is preferable. Furthermore, the Young's modulus of Si—SiC member 105 is lower than that of other silicon carbide ceramics, and thus, the thermal impact resistance is high, which is preferable.

The Young's modulus can be measured at 20°C. by a testing method for elastic modulus (ultrasonic pulse method: dynamic elastic modulus) defined by Japanese Industrial Standards (JIS R1602: 1995).

As a method for setting the Young's modulus of the Si—SiC member 105 to the above range, a method for adjusting the contents of SiC and Si within the above range is exemplified.

Flexural strength of the Si—SiC member 105 is preferably from 130 MPa to 300 MPa. The flexural strength of the Si—SiC member 105 is more preferably 200 MPa or more, further preferably 220 MPa or more, and particularly preferably 230 MPa or more.

The flexural strength of the Si—SiC member 105 is more preferably 260 MPa or less, further preferably 250 MPa or less, and particularly preferably 240 MPa or less.

In the case where the flexural strength of the Si—SiC member 105 satisfies the above range, breaking of the Si—SiC member 105 as well as the laminated member 100 due to a falling object can be prevented, and the impact resistance can be improved.

The flexural strength can be measured at 20°C. by a testing method for flexural strength (4-point flexural strength) defined by Japanese Industrial Standards (JIS R1601: 2008).

Vickers hardness (Hv) of the Si—SiC member 105 is preferably from 20 GPa to 27 GPa.

The Vickers hardness is more preferably 21 GPa or more, further preferably 22 GPa or more, and particularly preferably 23 GPa or more.

The Vickers hardness is more preferably 26 GPa or less, further preferably 25 GPa or less, and particularly preferably 24 GPa or less.

In the case where the Vickers hardness of the Si—SiC member 105 satisfies the above range, scratch resistances of the Si—SiC member 105 as well as the laminated member 100 are improved.

The Vickers hardness can be measured at 20°C. by a Vickers hardness testing system.

[Glass Member]

Glass compositions of the glass member 101 are not particularly limited. The examples of the glass member 101 include soda lime glass, borosilicate glass, aluminosilicate glass, or alkali-free glass. The glass member 101 may be glass (chemically strengthened glass) that is chemically strengthened, glass (physically strengthened glass) that is physically strengthened by air cooling or the like, or glass (crystallized glass) subjected to a crystallization treatment.

A preferable glass composition of the glass member 101 will be described. The glass composition (a content of a target component of the glass member) in the present specification is indicated by mole percent based on oxides (mol %).

The glass member 101 includes $SiO_2$. $SiO_2$ is a main component of the glass.

From the viewpoint of enhancing a weather resistance of the glass, the content of $SiO_2$ is preferably 55.0 mol % or more, more preferably 57.0 mol % or more, further preferably 60.0 mol % or more, and particularly preferably 62.0 mol % or more.

From the viewpoint of reducing a melting temperature and enhancing manufacturability of the glass, the content of $SiO_2$ is preferably 85.0 mol % or less, more preferably 83.0 mol % or less, further preferably 80.0 mol % or less, and particularly preferably 78.0 mol % or less.

The glass member 101 may or may not include $Al_2O_3$, but it is preferable to include $Al_2O_3$ from the viewpoint of enhancing the weather resistance of the glass and reducing a linear expansion coefficient.

From the viewpoint of being capable of increasing a Young's modulus of the glass, the content of $Al_2O_3$ is preferably 1.5 mol % or more, more preferably 3.0 mol % or more, further preferably 5.0 mol % or more, and particularly preferably 8.0 mol % or more.

From the viewpoint of enhancing an acid resistance of the glass, the content of $Al_2O_3$ is preferably 14.5 mol % or less. From the viewpoint of preventing devitrification of the glass (being capable of lowing a devitrification temperature), and preventing the melting temperature of the glass from rising to improve refining property, the content of $Al_2O_3$ is more preferably 14.0 mol % or less, further preferably 13.5 mol % or less, and particularly preferably 13.0 mol % or less.

The glass member 101 may or may not include $B_2O_3$, but it is preferable to include $B_2O_3$ from the viewpoint of being useful for adjusting the linear expansion coefficient of the glass.

From the viewpoint of reducing the linear expansion coefficient of the glass, the content of $B_2O_3$ is preferably 3.0 mol % or more, more preferably 4.0 mol % or more, further preferably 4.5 mol % or more, and particularly preferably 5.0 mol % or more.

From the viewpoint of enhancing the weather resistance of the glass, the content of $B_2O_3$ is preferably 14.0 mol % or less. From the viewpoint of being capable of increasing the Young's modulus of the glass, the content of $B_2O_3$ is preferably 11.5 mol % or less, more preferably 10.0 mol % or less, further preferably 8.5 mol % or less, and particularly preferably 7.5 mol % or less.

The glass member 101 may or may not include RO. RO is at least one of MgO, CaO, SrO, and BaO. A content of RO indicates a total amount of MgO, CaO, SrO, and BaO.

From the viewpoint of reducing the melting temperature of the glass to enhance solubility and controlling the linear expansion coefficient, the content of RO is preferably 2.0 mol % or more, more preferably 3.0 mol % or more, further preferably 4.0 mol % or more, and particularly preferably 5.0 mol % or more.

From the viewpoint of reducing the devitrification temperature to enhance manufacturability of the glass and controlling the linear expansion coefficient, the content of RO is preferably 25.0 mol % or less, more preferably 20.0 mol % or less, further preferably 16.0 mol % or less, and particularly preferably 15.0 mol % or less.

In order to reduce the melting temperature of the glass to enhance the solubility and control the linear expansion coefficient, MgO may be contained.

A content of MgO is preferably 1.0 mol % or more, more preferably 2.0 mol % or more, further preferably 2.5 mol % or more, and particularly preferably 3.0 mol % or more.

From the viewpoint of reducing the devitrification temperature of the glass to enhance the manufacturability and controlling the linear expansion coefficient, the content of MgO is preferably 15.0 mol % or less, more preferably 12.0 mol % or less, further preferably 10.0 mol % or less, and particularly preferably 9.0 mol % or less.

In order to reduce the melting temperature of the glass to enhance the solubility and control the linear expansion coefficient, CaO may be contained.

A content of CaO is preferably 0.5 mol % or more, and more preferably 1.0 mol % or more.

The content of CaO is preferably 10.0 mol % or less, and more preferably 8.0 mol % or less.

In order to reduce the melting temperature of the glass to enhance the solubility and control the linear expansion coefficient, SrO may be contained.

A content of SrO is preferably 0 mol % or more, more preferably 0.01 mol % or more, and further preferably 0.1 mol % or more.

The content of SrO is preferably 5.0 mol % or less, more preferably 3.0 mol % or less, and further preferably 2.0 mol % or less.

In order to reduce the melting temperature of the glass to enhance productivity and control the linear expansion coefficient, BaO may be contained.

A content of BaO is preferably 0 mol % or more, and more preferably 0.01 mol % or more.

The content of BaO is preferably 3.0 mol % or less, and more preferably 2.0 mol % or less Even if BaO is not intentionally contained, BaO may be mixed as an impurity derived from raw materials such as limestone, dolomite, or strontium carbonate, or from a manufacturing process.

The glass member 101 may or may not contain $R_2O$. $R_2O$ is at least one of $Li_2O$, $Na_2O$, and $K_2O$. A content of $R_2O$ indicates a total amount of $Li_2O$, $Na_2O$, and $K_2O$.

$R_2O$ is a component useful for promoting melting of a glass raw material and for adjusting the linear expansion coefficient, the melting temperature, and the like.

In order to achieve the above effects well, the content of $R_2O$ is preferably 0 mol % or more, and more preferably 0.01 mol % or more.

From the viewpoint of being capable of reducing the linear expansion coefficient of the glass and reducing a stress that occurs during a temperature change, the content of $R_2O$ is preferably 15.0 mol % or less, more preferably 10.0 mol % or less, further preferably 6.0 mol % or less, and particularly preferably 5.0 mol % or less.

A total amount of $R_2O$ where $Li_2O$ is not contained, that is, a total content of $Na_2O$ and $K_2O$ is preferably 0 mol % or more, and more preferably 0.01 mol % or more.

From the viewpoint of reducing the linear expansion coefficient, the total amount of $R_2O$ where $Li_2O$ is not contained, that is, the total content of $Na_2O$ and $K_2O$ is preferably 13.0 mol % or less, more preferably 10.0 mol % or less, further preferably 5.0 mol % or less, and particularly preferably 3.0 mol % or less.

$Li_2O$ is a component useful for promoting the melting of the glass raw material and for adjusting the linear expansion coefficient, the melting temperature, and the like.

A content of $Li_2O$ is preferably 0 mol % or more, and more preferably 0.01 mol % or more.

From the viewpoint of reducing the linear expansion coefficient of the glass and reducing the stress that occurs during the temperature change, the content of $Li_2O$ is preferably 10.0 mol % or less, more preferably 7.0 mol % or less, and further preferably 5.0 mol % or less.

$Na_2O$ is a component useful for promoting the melting of the glass raw material and for adjusting the linear expansion coefficient, the melting temperature, and the like.

The content of $Na_2O$ is preferably from 0 mol % to 13.0 mol %.

The content of $Na_2O$ is more preferably 0.01 mol % or more.

The content of $Na_2O$ is more preferably 10.0 mol % or less, further preferably 5.0 mol % or less, and particularly preferably 3.0 mol % or less.

In the case where the content of $Na_2O$ is 13.0 mol % or less, the linear expansion coefficient of the glass can be reduced, and the stress that occurs during the temperature change can be reduced.

$K_2O$ is a component useful for promoting the melting of the glass raw material and for adjusting the linear expansion coefficient, the melting temperature, and the like.

A content of $K_2O$ is preferably 0 mol % or more, and more preferably 0.01 mol % or more.

From the viewpoint of reducing the linear expansion coefficient of the glass and reducing a stress that occurs when exposed to a high temperature, the content of $K_2O$ is preferably 3.0 mol % or less, more preferably 1.0 mol % or less, and further preferably 0.1 mol % or less.

The glass member 101 may or may not include $ZrO_2$. In the case where $ZrO_2$ is included, a chemical resistance of the glass can be improved.

From the viewpoint of being capable of achieving the above effect well, a content of $ZrO_2$ is preferably 0 mol % or more, more preferably 0.01 mol % or more, and further preferably 0.1 mol % or more.

From the viewpoint of reducing the devitrification temperature of the glass and enhancing the productivity, the content of $ZrO_2$ is preferably 5.0 mol % or less, more preferably 3.0 mol % or less, and further preferably 2.0 mol % or less.

The glass member 101 may or may not include $P_2O_5$. In the case where $P_2O_5$ is included, crystallization of the glass can be prevented and the glass can be stabilized.

A content of $P_2O_5$ is preferably 0 mol % or more. From the viewpoint of being capable of achieving the above effect well, the content of $P_2O_5$ is more preferably 0.05 mol % or more, and further preferably 0.1 mol % or more.

From the viewpoint of being capable of stabilizing the glass without excessively increasing the melting temperature of the glass, and the viewpoint of preventing phase splitting in the glass to enhance the transparency, the content of $P_2O_5$ is preferably 3.5 mol % or less, more preferably 3.0 mol % or less, and further preferably 2.0 mol % or less.

The glass member 101 may or may not include $Fe_2O_3$. In the case where $Fe_2O_3$ is included, refining property of the glass can be improved and a temperature of a bottom substrate in a melting furnace can be controlled without impairing a color of the glass. It becomes easy to adjust the linear transmittance of the glass member 101 at a wavelength of 850 nm within a range described below, and a stable product can be obtained.

From the viewpoint of being capable of achieving the above effect well, the content of $Fe_2O_3$ is preferably 0.0001 mol % or more, more preferably 0.0005 mol % or more, and further preferably 0.0010 mol % or more.

From the viewpoint of maintaining the color of the glass, the content of $Fe_2O_3$ is preferably 0.0115 mol % or less, more preferably 0.0100 mol % or less, further preferably 0.0080 mol % or less, and particularly preferably 0.0050 mol % or less.

The glass member 101 may or may not include ZnO.

A content of ZnO is preferably 0 mol % or more, more preferably 0.01 mol % or more, further preferably 0.1 mol % or more, and particularly preferably 0.5 mol % or more.

From the viewpoint of reducing the devitrification temperature to enhance the productivity of the glass, the content of ZnO is preferably 15.0 mol % or less, more preferably 12.0 mol % or less, further preferably 10.0 mol % or less, and particularly preferably 8.0 mol % or less.

The glass member 101 may include other components (for example, $TiO_2$, $Y_2O_3$, and $Gd_2O_3$) other than the above, as long as the effects of the present invention are not impaired.

A total content of the other components is preferably 10.0 mol % or less.

The glass member 101 may appropriately include sulfates, chlorides, fluorides, halides, hydroxides, $SnO_2$, $Sb_2O_3$, $As_2O_3$, and the like as a refining agent for melting the glass.

Furthermore, coloring components such as Ni, Co, Cr, Mn, V, Se, Au, Ag, and Cd may be included for color adjustment.

In a case of being actively colored, coloring components such as Fe, Ni, Co, Cr, Mn, V, Se, Au, Ag, and Cd may be included in a range of 0.0001 mol % or more.

In the case where at least one selected from the group consisting of sulfates, chlorides, fluorides, halides, hydroxides, $SnO_2$, $Sb_2O_3$, and $As_2O_3$ among the above other components is included, a total content of the above group is preferably 0.01 mol % or more, more preferably 0.02 mol % or more, and further preferably 0.05 mol % or more, for the refining property.

From the viewpoint of adversely affecting a glass property, the total content of the above group is preferably 5.0 mol % or less, more preferably 2.0 mol % or less, and further preferably 1.0 mol % or less.

$SiO_2$, $Al_2O_3$, $B_2O_3$, and $P_2O_5$ are glass network formers.

From the viewpoint of enhancing stability and chemical durability of a glass structure, a total content of $SiO_2$, $Al_2O_3$, $B_2O_3$, and $P_2O_5$ in the glass member 101 is preferably 70.0 mol % or more, more preferably 75.0 mol % or more, further preferably 78.0 mol % or more, and particularly preferably 80.0 mol % or more.

From the viewpoint of preventing the melting temperature of the glass from rising and enhancing the refining property, the total content of $SiO_2$, $Al_2O_3$, $B_2O_3$, and $P_2O_5$ in the glass is preferably 97.0 mol % or less, more preferably 95.0 mol % or less, further preferably 93.0 mol % or less, and particularly preferably 90.0 mol % or less.

A preferred embodiment of the glass composition of the glass member 101 is such that from 55.0 mol % to 85.0 mol % of $SiO_2$, from 1.5 mol % to 14.5 mol % of $Al_2O_3$, from 3.0 mol % to 14.0 mol % of $B_2O_3$, from 0 mol % to 3.5 mol % of $P_2O_5$, and the total content of $SiO_2$, $Al_2O_3$, $B_2O_3$, and $P_2O_5$ in the glass member 101 is from 70.0% to 97.0% as represented by mole percent based on oxides. Accordingly, the glass property is more excellent.

A thickness of the glass member 101 is not particularly limited as long as the glass member has the thickness which can support the Si—SiC member 105. Specifically, the thickness of the glass member 101 is preferably from 2 mm to 40 mm.

The thickness of the glass member 101 is more preferably 3 mm or more, further preferably 5 mm or more, particularly preferably 10 mm or more, and most preferably 15 mm or more.

The thickness of the glass member 101 is more preferably 35 mm or less, further preferably 30 mm or less, and particularly preferably 25 mm or less.

In the case where the thickness of the glass member 101 is within the above range, a sufficient strength can be maintained as a supporting member.

The thickness of the glass member 101 can be measured by, for example, a caliper and a digital measure.

The average linear expansion coefficient $\beta$ of the glass member 101 at from 20° C. to 200° C. is preferably from 1.50 ppm/° C. to 5.00 ppm/° C. Hereinafter, the average linear expansion coefficient $\beta$ of the glass member 101 at from 20° C. to 200° C. is also simply referred to as an average linear expansion coefficient $\beta$.

The average linear expansion coefficient $\beta$ is more preferably 2.00 ppm/° C. or more, further preferably 2.50 ppm/° C. or more, and particularly preferably 2.60 ppm/° C. or more.

The average linear expansion coefficient $\beta$ is more preferably 4.50 ppm/° C. or less, further preferably 4.00 ppm/° C. or less, and particularly preferably 3.50 ppm/° C. or less.

In the case where the average linear expansion coefficient $\beta$ of the glass member 101 is in the above range, the average linear expansion coefficient $\beta$ of the glass member 101 and the average linear expansion coefficient of the Si—SiC member 105 can be readily matched with each other.

The average linear expansion coefficient β can be measured by a dilatometer whose temperature range to be measured is from 20° C. to 200° C., and a thermomechanical analyzer (TMA).

The absolute value |α−β| is preferably 2.00 ppm/° C. or less, in which the absolute value |α−β| is a value obtained by subtracting the average linear expansion coefficient β of the glass member 101 from the average linear expansion coefficient α of the Si—SiC member 105. The absolute value |α−β| is more preferably 1.00 ppm/° C. or less, further preferably 0.50 ppm/° C. or less, and particularly preferably 0.30 ppm/° C. or less.

In the case where the absolute value |α−β| is set to the above values or less, bending of the obtained laminated member 100 can be prevented.

The linear transmittance of the glass member 101 at the wavelength of 850 nm is preferably 80% or more, more preferably 85% or more, further preferably 90% or more, and particularly preferably 92% or more. In the case where the linear transmittance of the glass member 101 at the wavelength of 850 nm is 80% or more, a sufficient amount of infrared rays for heating use can be transmitted.

An upper limit of the linear transmittance of the glass member 101 is 100%.

The linear transmittance is a transmittance of light straightly transmitting through the glass member 101 in a thickness direction thereof with an incidence angle of incident light being 0 degrees, and can be measured at 20° C. by a spectrophotometer.

Examples of a method for setting the linear transmittance of the glass member 101 within the above ranges include a method for adjusting the content of $Fe_2O_3$ in the glass member 101 within the above ranges, and a method for forming an anti-reflective film to prevent surface reflection of the glass member 101. As a method for forming the anti-reflective film, generally known methods such as wet coating such as spray coating, spin coating, and flow coating, and dry coating such as sputtering and vapor deposition can be used.

The Young's modulus of the glass member 101 is preferably from 40 GPa to 120 GPa.

The Young's modulus of the glass member 101 is more preferably 45 GPa or more, further preferably 50 GPa or more, and particularly preferably 65 GPa or more.

The Young's modulus of the glass member 101 is more preferably 100 GPa or less, further preferably 95 GPa or less, and particularly preferably 90 GPa or less.

In the case where the Young's modulus of the glass member 101 is within the above ranges, sufficient strength can be maintained as the supporting member, and an amount of bending can be reduced.

The Young's modulus of the glass member 101 can be measured at 20° C. by an ultrasonic pulse method defined by Japanese Industrial Standards (JIS R1602: 1995).

The melting temperature of the glass member 101 is preferably from 1000° C. to 2000° C.

The melting temperature of the glass member 101 is more preferably 1300° C. or more, further preferably 1400° C. or more, and particularly preferably 1500° C. or more.

The melting temperature of the glass member 101 is more preferably 1900° C. or less, further preferably 1800° C. or less, and particularly preferably 1700° C. or less.

In the case where the melting temperature of the glass member 101 is within the above ranges, the refining of the glass and solubility of the raw material are excellent, and defects in the glass can be prevented.

The melting temperature of the glass member 101 indicates a temperature T2 (° C.) at which viscosity is measured by using a rotational viscometer and becomes $10^2$ dPa·s.

The devitrification temperature of the glass member 101 is preferably from 800° C. to 1600° C.

The devitrification temperature of the glass member 101 is more preferably 900° C. or more, further preferably 1000° C. or more, and particularly preferably 1100° C. or more.

The devitrification temperature of the glass member 101 is more preferably 1500° C. or less, further preferably 1400° C. or less, and particularly preferably 1350° C. or less.

In the case where the devitrification temperature of the glass member 101 is within the above ranges, defects generated during glass production are reduced.

The devitrification temperature of the glass member 101 is a maximum value of a temperature at which when crushed glass particles are put in a platinum plate and heat-treated for 17 hours in an electric furnace controlled at a constant temperature, crystals are not precipitated on a surface and inside of the glass according to observation with an optical microscope after the heat treatment.

[Bonding Layer]

The bonding layer 103 is a member that bonds the glass member 101 and the Si—SiC member 105 together.

Examples of resin included in the bonding layer 103 include epoxy resin, silicone resin, fluorine resin, and polyimide resin. The epoxy resin, the silicone resin, and the fluorine resin are preferred because of a superior heat resistance.

The resins may be used alone or in a combination of two or more kinds thereof

A content of the resin is preferably from 40 mass % to 100 mass %, more preferably from 50 mass % to 90 mass %, and further preferably from 60 mass % to 80 mass % with respect to a total weight of the bonding layer 103.

In the case where the content of the resin is within the above ranges, adhesion between the glass member 101 and the Si—SiC member 105 via the bonding layer 103 is more excellent, and a difference in the expansion coefficient from the Si—SiC member can be reduced.

The bonding layer 103 may or may not include components other than the resin (hereinafter, also referred to as "other components"). Specific examples of the other components include a plasticizer and a filler.

In the case where the bonding layer 103 includes the other components, a content of the other components is preferably from 10 mass % to 50 mass %, more preferably from 20 mass % to 40 mass %, and further preferably from 25 mass % to 35 mass % with respect to the total weight of the bonding layer 103. In the case where the content of the other components is 40 mass % or less, the adhesion between the glass member 101 and the Si—SiC member 105 via the bonding layer 103 is more excellent.

The bonding layer 103 can be made by using, for example, a heat press device. A resin film constituting the bonding layer 103 is sandwiched between the glass member 101 and the Si—SiC member 105 (this configuration is adopted as a temporary laminate). The temporary laminate is heated to a temperature above a softening point of the resin film, and the temporary laminate is pressurized to bond the glass member 101 and the Si—SiC member 105. In order to prevent bubbles from getting caught during bonding, it is preferable to pressurize the temporary laminate under vacuum atmosphere.

In order to enhance an anchor effect, a contact surface of the glass member 101 facing the resin film (the bonding layer 103) and a contact surface of the Si—SiC member 105 facing the resin film (the bonding layer 103) may be roughened moderately through blasting or the like.

A thickness of the bonding layer 103 is preferably from 0.001 mm to 0.300 mm.

The thickness of the bonding layer 103 may be 0.005 mm or more, may be 0.008 mm or more, or may be 0.010 mm or more.

The thickness of the bonding layer 103 may be 0.150 mm or less, may be 0.050 mm or less, or may be 0.030 mm or less.

The thickness of the bonding layer 103 can be calculated by using digital data of an image captured by SEM cross-sectional observation or using image processing software.

A linear transmittance of the bonding layer 103 at the wavelength of 850 nm is preferably 88% or more, more preferably 91% or more, further preferably 93% or more, and particularly preferably 95% or more. In the case where the linear transmittance of the bonding layer 103 is 88% or more, a sufficient amount of infrared rays for heating use can be transmitted.

An upper limit of the linear transmittance of the bonding layer 103 is 100%.

The linear transmittance is a transmittance of light straightly transmitting through the bonding layer 103 in a thickness direction thereof with an incidence angle of incident light being 0 degrees, and can be measured at 20° C. by a spectrophotometer.

A heat resistance temperature of the resin included in the bonding layer 103 is preferably from 120° C. to 420° C. From the viewpoint of stress relief during use at a high temperature, a temperature of from 120° C. to 300° C. is more preferable.

The heat resistance temperature of the resin included in the bonding layer 103 is further preferably 140° C. or more, particularly preferably 160° C. or more, and most preferably 180° C. or more.

The heat resistance temperature of the resin included in the bonding layer 103 may be 280° C. or less, 260° C. or less, or 240° C. or less.

The heat resistance temperature of the resin included in the bonding layer 103 is set to a temperature at which a weight of a measurement target object is decreased by 1 mass % which is obtained by conducting thermogravimetric analysis (TGA) under air atmosphere.

The average linear expansion coefficient γ of the bonding layer 103 at from 20° C. to 200° C. is preferably from 2 ppm/° C. to 200 ppm/° C. Hereinafter, the average linear expansion coefficient γ of the bonding layer 103 at from 20° C. to 200° C. is also simply referred to as an average linear expansion coefficient γ.

The average linear expansion coefficient γ is more preferably 4 ppm/° C. or more, further preferably 7 ppm/° C. or more, and particularly preferably 10 ppm/° C. or more.

The average linear expansion coefficient γ is more preferably 100 ppm/° C. or less, further preferably 50 ppm/° C. or less, particularly preferably 30 ppm/° C. or less, and most preferably 20 ppm/° C.

In the case where the average linear expansion coefficient γ of the bonding layer 103 is within the above ranges, adhesion is excellent and a difference in the expansion coefficient from the Si—SiC member can be reduced, and thus the laminated member 100 is excellent in the thermal impact resistance.

The average linear expansion coefficient γ can be measured by a dilatometer whose temperature range to be measured is from 20° C. to 200° C., and a thermomechanical analyzer (TMA).

As a method for setting the average linear expansion coefficient γ of the bonding layer 103 to the above range, a method in which the above resins are used and a filler such as carbon or silica is blended is exemplified.

In the case where the resin film is used to make the bonding layer 103, from the viewpoint of improving the adhesion between the Si—SiC member 105 and the glass member 101 and maintaining a shape of the entire member, a Young's modulus of the resin film is preferably 0.05 GPa or more, more preferably 0.10 GPa or more, and further preferably 0.15 GPa or more.

In the case where the resin film is used to make the bonding layer 103, from the viewpoint of reducing stress generated by the difference in the expansion coefficient from the Si—SiC member, the Young's modulus of the resin film is preferably 3.5 GPa or less, more preferably 3.0 GPa or less, further preferably 2.0 GPa or less, particularly preferably 1.0 GPa or less, and most preferably 0.5 GPa or less.

The stress generated by the difference in the expansion coefficient from the Si—SiC member increases as the Young's modulus of the resin layer increases, and decreases as the Young's modulus decreases.

The Young's modulus can be measured at 25° C. by a testing method for elastic modulus defined by Japanese Industrial Standards (JIS K7171:2008).

[Physical Properties and the Like of Laminated Member]

The amount of bending of the laminated member 100 is preferably 0.25 mm or less, more preferably 0.20 mm or less, still more preferably 0.10 mm or less, and particularly preferably 0.05 mm or less.

In the case where the amount of bending of the laminated member 100 is equal to or less than the above values, the stress can be prevented from concentrating on a specific portion when stress occurs, and thus the impact resistance can be further improved. When the laminated member 100 is applied to a kitchen, it is possible to prevent that the laminated member 100 reflects a distorted image of the surroundings due to the bending of the laminated member 100 and the design is detracted. When an object to be heated is placed on the laminated member 100, the object to be heated can be prevented from wobbling.

A lower limit of the amount of bending of the laminated member 100 is 0 mm.

The amount of bending of the laminated member 100 can be measured by a non-contact three-dimensional shape measuring instrument.

Examples of a method for setting the amount of bending of the laminated member 100 within the above ranges include a method for setting the thicknesses of the glass member 101, the bonding layer 103, and the Si—SiC member 105, and types and contents of components constituting each member (layer) as described above.

The density of the laminated member 100 is preferably from 2.40 g/cm$^3$ to 2.85 g/cm$^3$.

The density of the laminated member 100 is more preferably 2.45 g/cm$^3$ or more, further preferably 2.50 g/cm$^3$ or more, and particularly preferably 2.55 g/cm$^3$ or more.

The density of the laminated member 100 is more preferably 2.80 g/cm$^3$ or less, further preferably 2.75 g/cm$^3$ or less, and particularly preferably 2.70 g/cm$^3$ or less.

In the case where the density is in the above ranges, workability for incorporating the laminated member as a heating member into a housing is improved.

The density is a value obtained by dividing a total weight of the laminated member 100 by a total volume of the laminated member 100. The total weight of the laminated member 100 can be measured by a weight measuring instrument. The total volume of the laminated member 100 can be measured by a digital measure.

Examples of a method for setting the density of the laminated member 100 within the above ranges include a method for setting the thicknesses of the glass member 101, the bonding layer 103, and the Si—SiC member 105, and the types and contents of components constituting each member (layer) as described above.

An area of an uppermost surface of the laminated member 100 on a side of the Si—SiC member 105 (a principal surface of the laminated member 100 on the side of the Si—SiC member 105) is preferably from 0.01 m² to 10 m².

The area of the uppermost surface of the laminated member 100 is more preferably 0.07 m² or more, further preferably 0.15 m² or more, particularly preferably 0.30 m² or more, and most preferably 0.60 m² or more.

The area of the uppermost surface of the laminated member 100 is more preferably 8 m² or less, further preferably 4 m² or less, particularly preferably 2 m² or less, and most preferably 1 m² or less.

In the case where the area of the uppermost surface of the laminated member 100 is in the above range, the workability for incorporating the laminated member as a heating member into the housing is improved.

The area of the uppermost surface is calculated by measuring dimensions of the laminated member 100 with a digital measure.

[Method for Producing Laminated Member]

An example of a method for producing the laminated member 100 is a method in which the bonding layer 103 is disposed between the glass member 101 and the Si—SiC member 105, and the glass member 101 and the Si—SiC member 105 are bonded via the bonding layer 103.

An example of a specific method for producing the laminated member 100 includes a method in which the glass member 101, the bonding layer 103, and the Si—SiC member 105 are laminated in this order and then bonded together at a temperature of from 150° C. to 380° C.

<Another Embodiment>

As an example of the laminated member of the present invention, another embodiment of the laminated member (hereinafter, also referred to as "the laminated member according to another embodiment") different from the above laminated member 100 will be described.

The laminated member according to another embodiment further includes a second bonding layer lying on the above Si—SiC member 105, and a second Si—SiC member bonded to the Si—SiC member 105 via the second bonding layer.

The second Si—SiC member is configured in the same manner as the above Si—SiC member 105, and thus a description thereof is omitted.

By forming a structure in which the Si—SiC member 105 and the second Si—SiC member are laminated, a laminated member having a complicated shape can be readily produced. For example, in the case where a space for inserting a sensor for temperature measurement is included in the laminated member, one of the Si—SiC member 105 and the second Si—SiC member is grooved in advance, and is pasted to the other of the Si—SiC member 105 and the second Si—SiC member, so that the space can be readily included in the laminated member.

A method for bonding the Si—SiC member 105 and the second Si—SiC member via the second bonding layer is not particularly limited, and may include, for example, a bonding using a resin such as an epoxy resin and a fluorine resin, a bonding using a molten metal such as tin and indium, and a bonding using glass frit. When the laminated member is assumed to be used as a heating member, a bonding using metal is preferable in terms of heat resistance and thermal conductivity.

In terms of the heat resistance and the thermal conductivity, the glass frit has a high heat resistance but has a low thermal conductivity, and the resin has a low heat resistance and a low thermal conductivity, and thus, the bonding using metal is preferable. Specific examples of metals include indium, tin, tin-based alloys, and lead-based alloys. In terms of the thermal conductivity, the heat resistance, and environmental load, tin metal and tin-based alloys are preferable in particular.

An example for bonding by using molten metal is described. The Si—SiC member 105 and the second Si—SiC member are heated to a desired temperature, for example, from 250° C. to 270° C. While ultrasonic waves are applied to bonding surfaces of the Si—SiC member and the second Si—SiC member that have been heated, the molten metal at a temperature around desired temperature (for example, from 250° C. to 270° C.) is applied to the bonding surfaces, and thereafter, the bonding surfaces are overlaid on each other.

The laminated member according to another embodiment may further include a third bonding layer lying on the second Si—SiC member and a third Si—SiC member bonded to the second Si—SiC member via the third bonding layer. The third bonding layer is configured in the same manner to the second bonding layer. The third Si—SiC member is configured in the same manner to the Si—SiC member 105. However, in terms of the thickness, the laminated member according to another embodiment preferably does not include the third bonding layer and the third Si—SiC member.

The laminated member of the present invention may include a configuration capable of rapidly cooling the laminated member.

For example, the laminated member 100 may include a flow path disposed at least one between the glass member 101 and the bonding layer 103 and between the Si—SiC member 105 and the bonding layer 103. Alternatively, in the laminated member 100, at least one of the glass member 101 and the Si—SiC member 105 may be processed to serve as the flow path.

The laminated member according to another embodiment may include a flow path that is disposed at least one between the glass member 101 and the bonding layer 103, between the Si—SiC member 105 and the bonding layer 103, between the Si—SiC member 105 and the second bonding layer, and between the second Si—SiC member and the second bonding layer. Alternatively, in the laminated member according to another embodiment, at least one of the glass member 101, the Si—SiC member 105, and the second Si—SiC member may be processed to serve as the flow path.

The laminated member can be cooled by flowing water through the flow path.

The laminated member of the present invention may include an anti-reflective film for enhancing the transmittance and an irradiation efficiency.

For example, the laminated member 100 may include an anti-reflective film lying on a principal surface of the glass member 101 on an opposite side from the bonding layer 103 and/or a principal surface of the glass member 101 on a side of the bonding layer 103.

The laminated member according to another embodiment may include an anti-reflective film lying on a principal surface of the Si—SiC member 105 on the side of the bonding layer 103 or a principal surface of the second Si—SiC member on a side of the second bonding layer.

In the case where the anti-reflective film is provided on a surface for transmitting the infrared rays, the irradiation efficiency (heating efficiency) can be enhanced.

The laminated member of the present invention may include a temperature sensor.

For example, the laminated member 100 may include a temperature sensor inside of the Si—SiC member 105. The laminated member according to another embodiment may include a temperature sensor inside of the Si—SiC member 105 or inside of the second Si—SiC member.

A specific configuration including the temperature sensor is such that a hole is made in a side surface of the Si—SiC member 105 or the second Si—SiC member, and the temperature sensor is inserted into the hole. In this case, the temperature sensor is provided immediately under a principal surface of the Si—SiC member 105 on an opposite side from the bonding layer 103 or immediately under a principal surface of the second Si—SiC member on an opposite side from the second bonding layer. The temperature sensor is provided such that the temperature sensor does not come into contact with the bonding layer 103 or the second bonding layer and such that the temperature sensor is not exposed. The temperature sensor can measure a temperature of the principal surface of the Si—SiC member 105 on the opposite side from the bonding layer 103 or a temperature of the principal surface of the second Si—SiC member on the opposite side from the second bonding layer.

The laminated member of the present invention can be suitably used as a heating member. The laminated member of the present invention can be suitably used as, for example, a heating member of a heat cooking device.

The laminated member of the present invention may be used as a worktop (countertop) of a kitchen.

The laminated member of the present invention may have functions of both a top plate of a heat cooking device and a worktop of a kitchen.

EXAMPLES

Hereinafter, an embodiment of the present invention will be described with reference to Examples, but the embodiment of the present invention is not limited thereto.

[Glass Member]

Produced glass is shown in Table 1.

TABLE 1

| | | Type of glass member | | | | | | |
|---|---|---|---|---|---|---|---|---|
| | | i-A | i-B | i-C | ii | iii | iv | v |
| Composition (mol %) | $SiO_2$ | 66.4 | 66.4 | 66.4 | 67.3 | 66.6 | 82.9 | 80.9 |
| | $Al_2O_3$ | 13.0 | 13.0 | 13.0 | 8.6 | 12.1 | 1.8 | 2.0 |
| | $B_2O_3$ | 5.6 | 5.6 | 5.6 | 6.3 | 6.3 | 11.3 | 13.0 |
| | MgO | 8.0 | 8.0 | 8.0 | 5.5 | 3.5 | | |
| | CaO | 6.0 | 6.0 | 6.0 | 1.1 | 0.5 | | |
| | SrO | 1.0 | 1.0 | 1.0 | | | | |
| | ZnO | | | | 7.7 | 6.0 | | |
| | $Li_2O$ | | | | | 4.0 | | |
| | $Na_2O$ | | | | 2.5 | 1.0 | 3.9 | 3.6 |
| | $K_2O$ | | | | | | | 0.4 |
| | $ZrO_2$ | | | | 1.0 | | | |
| | $P_2O_5$ | | | | | | | |
| | $Fe_2O_3$ | 0.0012 | 0.0036 | 0.0120 | 0.0013 | 0.0013 | 0.0047 | 0.0041 |
| | $SnO_2$ | | | | | | 0.15 | 0.15 |
| | SUM | 100.0 | 100.0 | 100.0 | 100.0 | 100.0 | 100.0 | 100.0 |
| $SiO_2 + Al_2O_3 + B_2O_3 + P_2O_5$ (mol %) | | 85.0 | 85.0 | 85.0 | 82.2 | 85.0 | 96.0 | 95.9 |
| Thickness | mm | 14 | 5 | 14 | 14 | 14 | 14 | 14 |
| Average linear expansion coefficient β | ppm/° C. | 3.10 | 3.10 | 3.10 | 3.20 | 3.20 | 3.30 | 3.30 |
| Linear transmittance | % | 91.5 | 91.4 | 79.1 | 91.4 | 91.7 | 86.8 | 88.5 |
| Young's modulus | Gpa | 84 | 84 | 84 | 78 | 80 | 64 | 60 |
| Melting temperature (T2) | ° C. | 1642 | 1642 | 1642 | 1646 | 1610 | 1980 | 1900 |
| Devitrification temperature | ° C. | 1275 | 1275 | 1275 | 1325 | 1325 | 1050 | 1075 |
| Phase splitting | | A | A | A | A | A | A | A |

| | | Type of glass member | | | | | |
|---|---|---|---|---|---|---|---|
| | | vi | vii | viii | ix | x | xi |
| Composition (mol %) | $SiO_2$ | 100.0 | 66.5 | 63.5 | 71.7 | 64.0 | 65.6 |
| | $Al_2O_3$ | | 12.0 | 15.0 | 0.8 | 13.7 | 12.0 |
| | $B_2O_3$ | | 10.0 | 10.0 | | 13.1 | 10.4 |
| | MgO | | 6.5 | 5.5 | 4.2 | 2.0 | 1.0 |
| | CaO | | 4.5 | 4.0 | 10.1 | 0.5 | |
| | SrO | | 0.5 | 2.0 | | | |
| | ZnO | | | | | | |
| | $Li_2O$ | | | | | 1.4 | 0.4 |
| | $Na_2O$ | | | | 13.2 | 2.2 | 0.6 |
| | $K_2O$ | | | | | | |
| | $ZrO_2$ | | | | | | |

TABLE 1-continued

|  |  |  |  |  |  |  |  |
|---|---|---|---|---|---|---|---|
| $P_2O_5$ |  |  |  |  |  | 3.0 | 9.9 |
| $Fe_2O_3$ |  |  | 0.0012 | 0.0034 | 0.0015 | 0.0013 | 0.0013 |
| $SnO_2$ |  |  |  |  |  | 0.10 | 0.10 |
| SUM |  | 100.0 | 100.0 | 100.0 | 100.0 | 100.0 | 100.0 |
| $SiO_2 + Al_2O_3 + B_2O_3 + P_2O_5$ (mol %) |  | 100.0 | 88.5 | 88.5 | 72.5 | 93.8 | 97.9 |
| Thickness | mm | 14 | 14 | 14 | 14 | 14 | 14 |
| Average linear expansion coefficient $\beta$ | ppm/° C. | 0.50 | 2.80 | 2.90 | 8.10 | 3.00 | Unmeasurable |
| Linear transmittance | % | 92.8 | 91.7 | 89.9 | 91.0 | 91.2 | Unmeasurable |
| Young's modulus | Gpa | 74 | 77 | 71 | 73 | 68 | Unmeasurable |
| Melting temperature (T2) | ° C. | Unmeasurable | 1660 | 1602 | 1450 | 1700 | 1890 |
| Devitrification temperature | ° C. | 1200 | 1350 | >1400 | 1020 | 1400 | Unmeasurable |
| Phase splitting |  | A | A | A | A | A | C |

(Glass Producing Procedure)

The glass (i-A) to (v) and (vii) to (xi) in Table 1 were produced as follows so as to achieve the glass compositions shown in Table 1 as represented mole percent based on oxides. Commonly used glass raw materials such as oxides, hydroxides, carbonates, sulfates, halides, or nitrates were selected as necessary and weighed out to 10,000 g as glass. Next, the mixed raw materials were put into a platinum crucible, placed in an electrical resistance furnace at from 1500° C. to 1700° C., melted for about 12 hours, defoamed, and homogenized. The obtained molten glass was poured into a mold, held at a temperature higher than a glass transition point by 50° C. for 1 hour, and then cooled to a room temperature at a rate of 0.5 ° C./min to obtain a glass block.

As the glass (vi) in Table 1, synthetic quartz glass (product name: AQ) produced by AGC Inc. was used.

The obtained glass block was cut, ground, and polished to obtain a glass member (having a length of 300 mm and a width of 300 mm).

[Physical Properties of Glass Member]

The following measurements were conducted on the obtained glass member. Measurement results are shown in Table 1.

The thickness was measured at 20° C. with a digital measure.

The average linear expansion coefficient $\beta$ was measured by a high precision dilatometer "DIL402 Expedis" produced by NETZSCH-Geratebau GmbH. in the temperature range of from 20° C. to 200° C.

The linear transmittance was measured at 20° C. and a wavelength of 850 nm with a spectrophotometer.

The glass (xi) in Table 1 was cloudy, and the linear transmittance was clearly less than 80%, and thus the linear transmittance was not measured.

The Young's modulus was measured at 20° C. by an ultrasonic pulse method defined by Japanese Industrial Standards (JIS R1602: 1995).

The melting temperature (T2) indicates the temperature T2 (° C.) at which the viscosity is measured by using a rotational viscometer and becomes $10^2$ dPa·s.

The melting temperatures (T2) of the glass (iv) and the glass (v) in Table 1 could not be measured, and thus the melting temperatures were calculated by extrapolation.

The devitrification temperature is a maximum value of a temperature (° C.) at which when crushed glass particles are put in a platinum plate and heat-treated for 17 hours in an electric furnace controlled at a constant temperature, crystals are not precipitated on a surface and inside of the glass according to observation with an optical microscope after the heat treatment.

The phase splitting was evaluated by observing the glass member with a scanning electron microscope (SEM), and the case where the phase splitting was not confirmed was indicated as "A", and the case where the phase splitting was confirmed was indicated as "C".

[Si—SiC Member]

Produced Si—SiC members are shown in Table 2.

TABLE 2

|  |  | Type of Si—SiC member |  |  |  |  |  |  |  |
|---|---|---|---|---|---|---|---|---|---|
|  |  | a-1 | a-2 | a-3 | b | c | d | e | f |
| Composition (mass %) | Si | 14 | 14 | 14 | 11.7 | 29 | 57 | 10.5 | 31 |
|  | SiC | 86 | 86 | 86 | 88.3 | 71 | 43 | 89.5 | 69 |
|  | SUM | 100 | 100 | 100 | 100 | 100 | 100 | 100 | 100 |
| Thickness | mm | 5 | 10 | 15 | 5 | 5 | 5 | 5 | 10 |
| Average linear expansion coefficient $\alpha$ | ppm/° C. | 3.06 | 3.06 | 3.06 | 3.17 | 2.88 | 2.58 | 3.14 | 2.69 |
| Thermal conductivity (20° C.) | W/m·K | 230 | 230 | 230 | 203 | 234 | 256 | 168 | 223 |
| Young's modulus | GPa | 388 | 388 | 388 | 391 | 379 | 221 | 403 | 366 |

TABLE 2-continued

| | | Type of Si—SiC member | | | | | | | |
|---|---|---|---|---|---|---|---|---|---|
| | | a-1 | a-2 | a-3 | b | c | d | e | f |
| Flexural strength | MPa | 219 | 219 | 219 | 221 | 241 | 82 | 233 | 204 |
| Vickers hardness | GPa | 23.5 | 23.5 | 23.5 | 24.1 | 23.4 | 9.1 | 23.8 | 20.7 |

(Si—SiC Member Producing Procedure)

The Si—SiC members (a-1) to (a-3) were produced as follows.

An α-SiC powder A1 was classified with a 325-mesh sieve to obtain an α-SiC powder A2 (having maximum particle size of 44 μm, and average particle size of 8 μm). The α-SiC powder A2 was washed with mixed acid (hydrofluoric acid:nitric acid=2:1 (mass ratio)) and pure water to obtain an α-SiC powder A3 (having iron content of 2.1 mass ppm). The α-SiC powder A3, the pure water, and acrylic resin emulsion (binder) were mixed to obtain slurry (having solid content concentration of about 75 mass %).

Next, the slurry was poured into a plaster mold to obtain a molded body (size: 320 mm×320 mm×16 mm). The obtained molded body was dried at 50° C. for 14 days and then sintered at 1900° C. in an electric furnace under an inert atmosphere of argon to obtain a sintered body. Porosity of the sintered body was 18.2%.

Next, a sintered body A1 was transferred to another electric furnace, high-purity silicon was melt-impregnated with the sintered body A1 under vacuum at 1500° C. to obtain a Si—SiC member in which all pores were filled with high-purity silicon. A content of iron contained in the Si—SiC member was 2.2 ppm.

Next, the Si—SiC member was processed to have a length of 30 cm, a width of 30 cm, and thicknesses as shown in Table 2, and the Si—SiC members (a-1) to (a-3) were obtained.

The Si—SiC member (b) was produced in the same manner as the Si—SiC member (a-1) except that the solid content concentration of the slurry was changed to about 79 mass %.

The Si—SiC member (c) was produced in the same manner as the Si—SiC member (a-1) except that the solid content concentration of the slurry was changed to about 61 mass %.

The Si—SiC member (d) was produced as follows.

48.2 mass % of SiC powder (produced by Pacific Rundum Co., Ltd., model number: GMF-12S (average particle diameter 0.7 μm)), 25.0 mass % of silicon powder (produced by Yamaishi Metal Co., Ltd., model number: No. 700 (average particle diameter 2.5 μm)), 5.5 mass % of METOLOSE (produced by Shin-Etsu Chemical Co., Ltd., model number: SM8000) as a binder, and 21.5 mass % of pure water were added to a kneader (produced by Miyazaki Iron Works Co., Ltd., model number: MP100) and kneaded for 6 hours to obtain a clay.

The obtained clay was introduced into an extrusion molding machine (made by Miyazaki Iron Works Co., Ltd., model number: FM100), and was extruded and molded under a condition of a head pressure of 1.0 MPa and a discharge speed of 1200 g/min to obtain a molded body. The obtained molded body was dried at 50° C. for 14 days and then heated under air atmosphere at 450° C. for 3 hours and degreased to obtain a degreased body.

The obtained degreased body was baked in a carbon baking furnace under a condition of 1700° C. under vacuum atmosphere of $10^{-3}$ Pa for 2 hours to obtain a sintered body.

Si was impregnated with the obtained sintered body under a condition of 1500° C. with argon atmosphere to obtain a Si—SiC member. The obtained Si—SiC member was processed to have a length of 30 cm, a width of 30 cm, and thicknesses as shown in Table 2 to obtain the Si—SiC member (d).

The Si—SiC member (e) was produced in the same manner as the Si—SiC member (a-1) except that the solid content concentration of the slurry was changed to about 77 mass %.

The Si—SiC member (f) was produced in the same manner as the Si—SiC member (a-1) except that the solid content concentration of the slurry was changed to about 58 mass %.

[Physical Properties of Si—SiC Member]

The following measurements were conducted on the obtained Si—SiC members (a-1) to (f). Measurement results are shown in Table 2.

Each of component amounts (compositions) in the Si—SiC members was measured by an inductively coupled plasma mass spectrometer ICP-MS (produced by Shimadzu Corporation).

The thicknesses were measured at 20° C. using a caliper (AD-5764A) produced by A&D Company, Limited.

The average linear expansion coefficient α was measured by a thermomechanical analyzer (TMA) "TMA4000SA" produced by Bruker AXS GmbH in the temperature range of from 20° C. to 200° C.

The thermal conductivity was measured under a temperature of 20° C. by a laser flash thermal measurement device "MODEL LFA-502" produced by Kyoto Electronics Manufacturing Co., Ltd.

The Young's modulus was measured at 20° C. by testing methods for elastic modulus (dynamic elastic modulus method) defined by Japanese Industrial Standards (JIS R1602: 1995) using an Auto Com universal material testing instrument "AC-300KN" produced by T.S.E Co., Ltd.

The flexural strength was measured at 20° C. by a testing method for flexural strength (4-point flexural strength) defined by Japanese Industrial Standards (JIS R1601: 2008) using the Auto Com universal material testing instrument "AC-300KN" produced by T.S.E Co., Ltd.

The Vickers hardness was measured at 20° C. by pushing in for 15 seconds with a pushing load of 10 kgf using a Vickers hardness testing system (produced by Nippon Steel & Sumikin Technology Co., Ltd.).

[Bonding Layer]

The following measurements were conducted on resin films shown in Table 3. Measurement results are shown in Table 3. The resin films shown in Table 3 serve as the bonding layers of the laminated member.

TABLE 3

| | | Type of resin film (bonding layer) | | |
| --- | --- | --- | --- | --- |
| | | F | EP | PI |
| | | Type of resin constituting resin film | | |
| | | Fluorine resin | Epoxy resin | Polyimide resin |
| Thickness | mm | 0.03 | 0.03 | 0.03 |
| Linear transmittance | % | 95.4 | 90.4 | 87.8 |
| Heat resistance temperature | °C. | 411 | 255 | 215 |
| Average linear expansion coefficient γ | ppm/°C. | 188.2 | 15.1 | 36.1 |
| Young's modulus | Gpa | 0.16 | 2.3 | 3.4 |

The thicknesses were measured with a digital measure.

The linear transmittance was measured by a spectrophotometer at 20° C. and 850 nm.

The heat resistance temperature was set to a temperature at which a weight of the resin film decreased by 1 mass % which was obtained by conducting thermogravimetric analysis (TGA) under air atmosphere.

The average linear expansion coefficient γ was measured by the thermomechanical analyzer (TMA) "TMA4000SA" produced by Bruker AXS GmbH in the temperature range of from 20° C. to 200° C.

The average linear expansion coefficient γ of the resin film and the average linear expansion coefficient γ of the bonding layer obtained using the resin film, which will be described later, were the same value.

The Young's modulus was measured at 25° C. by testing methods for elastic modulus defined by Japanese Industrial Standards (JIS K7171:2008) using a universal material testing instrument (model type 5966) produced by Instron Corporation.

[Laminated Member]

Produced laminated members are shown in Table 4.

TABLE 4

| | Example | | | | | | | | | | | | |
| --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 |
| Glass member | i-A | i-A | i-A | i-A | i-A | i-A | i-A | i-A | i-B | ii | iii | iv | v |
| Bonding layer | F | EP | PI | F | F | F | F | F | F | F | F | F | F |
| Si—SiC member | a-1 | a-1 | a-1 | b | c | d | e | f | a-2 | a-1 | a-1 | a-1 | a-1 |
| Temperature increase evaluation | A | A | A | A | A | A | A | A | A | A | A | A | A |
| Impact resistance evaluation | A | A | A | A | A | A | A | B | A | A | A | A | A |
| Heat resistance evaluation | A | A | C | A | A | A | A | A | A | A | A | A | A |
| Thermal impact resistance evaluation | A | A | A | A | A | C | A | C | A | A | A | A | A |
| Amount of bending (mm) | 0.001 | 0.013 | 0.058 | 0.023 | 0.021 | 0.071 | 0.022 | 0.013 | 0.061 | 0.005 | 0.010 | 0.054 | 0.057 |
| Density (g/cm³) | 2.60 | 2.60 | 2.60 | 2.62 | 2.58 | 2.51 | 2.63 | 2.63 | 2.83 | 2.58 | 2.68 | 2.44 | 2.41 |
| Area (m²) | 0.09 | 0.09 | 0.09 | 0.09 | 0.09 | 0.09 | 0.09 | 0.09 | 0.09 | 0.09 | 0.09 | 0.09 | 0.09 |
| Thickness of bonding layer (mm) | 0.017 | 0.036 | 0.039 | 0.018 | 0.018 | 0.019 | 0.017 | 0.017 | 0.023 | 0.057 | 0.013 | 0.016 | 0.033 |

| | Example | | | | | | | | | | | |
| --- | --- | --- | --- | --- | --- | --- | --- | --- | --- | --- | --- | --- |
| | 14 | 15 | 16 | 17 | 18 | 19 | 20 | 21 | 22 | 23 | 24 | 25 |
| Glass member | vi | — | — | i-A | i-A | i-A | vii | viii | vii | ix | x | xi |
| Bonding layer | F | — | — | — | EP | EP | EP | EP | EP | EP | EP | EP |
| Si—SiC member | a-1 | a-3 | a-1 | — | d | f | a-1 | a-2 | a-2 | a-1 | a-2 | a-2 |
| Temperature increase evaluation | A | C | A | C | A | A | A | A | A | A | A | C |
| Impact resistance evaluation | A | A | C | — | A | A | A | A | A | B | A | — |
| Heat resistance evaluation | A | A | A | A | A | A | A | A | A | A | A | — |
| Thermal impact resistance evaluation | A | — | — | — | C | C | A | A | A | A | A | — |
| Amount of bending (mm) | 0.472 | 0.009 | 0.012 | 0.009 | 0.088 | 0.024 | 0.013 | 0.015 | 0.016 | 0.821 | 0.003 | 0.025 |
| Density (g/cm³) | 2.41 | 3.01 | 3.01 | 2.46 | 2.51 | 2.63 | 2.60 | 2.68 | 2.69 | 2.63 | 2.65 | 2.64 |

TABLE 4-continued

| Area (m²) | 0.09 | 0.09 | 0.09 | 0.09 | 0.09 | 0.09 | 0.09 | 0.09 | 0.09 | 0.09 | 0.09 | 0.09 |
|---|---|---|---|---|---|---|---|---|---|---|---|---|
| Thickness of bonding layer (mm) | 0.059 | — | — | — | 0.019 | 0.027 | 0.048 | 0.029 | 0.033 | 0.052 | 0.031 | 0.036 |

(Producing Procedure)

Samples (laminated members) of Examples 1 to 14 and 18 to 25 were produced so as to have a combination of members shown in Table 4. In addition, samples of Examples 15 to 17 were prepared.

Examples 1 to 5, 7, 9 to 14, and 20 to 24 are Examples, and Examples 6, 8, 15 to 19, and 25 are Comparative Examples.

First, using SiC abrasive paper, a surface of the glass member, shown in Table 1, which was in contact with the resin film was processed into a surface roughness of Ra=0.2 mm. Likewise, using the SiC abrasive paper, a surface of the Si—SiC member, shown in Table 2, which was in contact with the resin film was processed into a surface roughness of Ra=0.2 mm.

Next, the resin film shown in Table 3 was sandwiched between the glass member and the Si—SiC member, heated to a temperature higher than the softening point of the resin film by 20° C., and pressed with a pressure of 2 MPa for 5 minutes. So that the glass member and the Si—SiC member were bonded via the bonding layer. Accordingly, the samples (laminated members) of Examples 1 to 14 and 18 to 25 were obtained.

[Evaluation of Laminated Member]

The respective samples were evaluated as follows. Evaluation results are shown in the above Table 4.

(Evaluation of Temperature Increase)

Using nine infrared lamps of 2 kW, the samples of Examples were irradiated with infrared rays (850 nm) for 2 minutes, and the temperature increase was evaluated.

In the case where a temperature of an outermost layer of the sample exceeds 200° C., an evaluation criterion was set to A, and in the case where the temperature of the outermost layer does not exceed 200° C., the evaluation criterion was set to C.

With the samples of Examples 1 to 14 and 18 to 25 which are the laminated members, infrared rays were irradiated from a side of a glass member, and the evaluations were performed with the temperature of the outermost layer on the side of the Si—SiC member. With the samples of Examples 15 to 17, the evaluations were performed with a temperature of an outermost layer on a side opposite from an infrared irradiation side.

(Evaluation of Thermal Impact Resistance)

A steel ball having a weight of 533 g was dropped onto the respective samples to evaluate the impact resistance. The evaluation of the thermal impact resistance was conducted with three samples (n=3) for each of Examples. Support frame made of a rubber plate having a thickness of 3 mm, a width of 15 mm, and hardness of A50 were attached to an outer peripheral portion of the sample to sandwich and fix the sample from up and down. The steel ball was dropped so as to fall onto an area within a radius of 25 mm from a center of the sample.

With a ball falling height being 20 cm, in the case where two or more samples of the three samples broke, an evaluation criterion was set to C, in the case where one sample of the three samples broke, the evaluation criterion was set to B, and in the case where the three samples did not break, the evaluation criterion was set to A, and B or higher was regarded as a pass.

The steel ball was dropped from the side of the Si—SiC member on the samples of Examples 1 to 14 and 18 to 24 which are the laminated members. The samples of Examples 17 and 25 were not evaluated for the impact resistance.

(Evaluation of Heat Resistance)

A sample of each Example was heated at a temperature of 230° C. for 24 hours and visually evaluated for changes in appearance. In the case where there was no change in appearance (discoloration, foaming, generation of foreign matters, exudation of the bonding layer, and the like), an evaluation criterion was set to A, and in the case where there was a change in appearance, the evaluation criterion was set to C. The sample of Example 25 was not evaluated for the heat resistance.

(Amount of Bending)

An amount of bending of each of the samples of Examples was measured by measuring a three-dimensional texture of a sample surface according to ISO25178-605 using a non-contact three-dimensional shape measuring instrument "NH-5Ns" produced by Mitaka Kohki Co., Ltd. and calculating a maximum inclination-based flatness of a sample surface.

Specifically, with the sample being placed on a precision surface plate, a height of each point of an upper surface of the sample was measured by using a laser autofocus microscope, and a value of a gap formed when the upper surface of the sample is sandwiched by two parallel surfaces, that is, the maximum inclination-based flatness is derived as the amount of bending.

(Density)

A density of each of the samples of Examples was obtained by dividing the weight by the volume measured by a digital measure produced by DIGI-TEK Inc.

(Area)

An area of an uppermost surface (a principal surface where a Si—SiC member is exposed in the case of a laminated member; or one of the principal surfaces in the case of a single member) of each of the samples of Examples was derived from the dimensions measured by the digital measure produced by DIGI-TEK Inc.

(Thickness of Bonding Layer)

Thicknesses of the bonding layers (resin) of the samples of Examples 1 to 14 and 18 to 25 were calculated from the SEM cross-sectional observation.

(Evaluation of Thermal Impact Resistance)

According to a combination same as samples of Examples 1 to 14 and 18 to 24, the laminated member having a width of 15 mm and a length of 100 mm was produced, the side of the Si—SiC member was heated by using a hot plate to give a temperature difference from the glass and the thermal impact resistance was evaluated. Specifically, the surface of the Si—SiC member was heated by using the hot plate set at 220° C., and the side of the glass member was cooled by using a cooling plate cooled to 10° C. by flowing cooling water, and held for 1 hour with the given temperature difference.

In the case where cracks or cloudiness was observed in an adhesive layer by visual observation, an evaluation criterion was set to C, and in the case where there was no change, the evaluation criterion was set to A. The samples of Examples 15 to 17 and Example 25 were not evaluated for the thermal impact resistance.

According to the results in Table 4, it was found that the laminated member of the present invention has a high speed of temperature rise, high impact resistance, and high thermal impact resistance, and is suitable as a heating member (Examples 1 to 5, 7, 9 to 14, and 20 to 24).

Although various Examples have been described above with reference to the drawing, it is needless to say that the present invention is not limited to such Examples. It is apparent to those skilled in the art that various changes and modifications can be conceived within the scope of the claims, and it is also understood that such variations and modifications belong to the technical scope of the present invention. Components in Examples described above may be combined freely within a range not departing from the spirit of the invention.

The present application is based on a Japanese patent application (Japanese Patent Application No. 2020-101051) filed on Jun. 10, 2020, a Japanese patent application (Japanese Patent Application No. 2020-161312) filed on Sep. 25, 2020, and a Japanese patent application (Japanese Patent Application No. 2021-007287) filed on Jan. 20, 2021, contents of which are incorporated in the present application by reference.

REFERENCE SIGNS LIST

100: laminated member
101: glass member
103: bonding layer
105: Si—SiC member

The invention claimed is:

1. A laminated member, comprising:
   a glass member having a linear transmittance at a wavelength of 850 nm of 80% or more and a thickness in a range of 3 mm to 40 mm;
   a bonding layer comprising a resin and formed on the glass member; and
   a Si—SiC member formed on the bonding layer and having a thickness in a range of 0.5 to 15mm, such that the Si—SiC member has an average linear expansion coefficient $\alpha$ at 20 to 200° C. of 2.85 to 4.00 ppm/° C.

2. The laminated member according to claim 1, wherein the glass member has an average linear expansion coefficient $\delta$ at 20 to 200° C. of to 1.50 to 5.00 ppm/° C.

3. The laminated member according to claim 1, wherein the glass member has a composition comprising 55.0 to 85.0 mol % of $SiO_2$, 1.5 to 14.5 mol % of $Al_2O_3$, 3.0 to 14.0 mol % of $B_2O_3$, and 0 to 3.5 mol % of $P_2O_5$, as represented by mole percent based on oxides, and has a total content of the $SiO_2$, the $Al_2O_3$, the $B_2O_3$, and the $P_2O_5$ in a range of 70.0 to 97.0% as represented by mole percent based on oxides.

4. The laminated member according to claim 3, wherein the glass member has a content of the $B_2O_3$ in a range of 8.5 mol % or less.

5. The laminated member according to claim 1, wherein the glass member comprises from has a composition comprising 0 to 13.0 mol % of $Na_2O$, as represented by mole percent based on oxides.

6. The laminated member according to claim 1, wherein the glass member has a composition comprising 0.0001 to 0.0115 mol % of $Fe_2O_3$, as represented by mole percent based on oxides.

7. The laminated member according to claim 1, wherein the glass member has the linear transmittance of 90% or more at a wavelength of 850 nm.

8. The laminated member according to claim 1, wherein the glass member has a thickness of 5 mm or more, and the Si—SiC member has a thickness of 1.5 mm or more.

9. The laminated member according to claim 1, wherein the Si—SiC member has a thermal conductivity in a range of 190 to 300 W/m·K at 20° C.

10. The laminated member according to claim 1, wherein the laminated member has an absolute value $|\alpha-\beta|$ of 2.00 ppm/° C. or less, where the absolute value $|\alpha-\beta|$ is a value obtained by subtracting an average linear expansion coefficient $\beta$ of the glass member at 20 to 200° C. from the average linear expansion coefficient a of the Si—SiC member at 20 to 200° C.

11. The laminated member according to claim 1, wherein the Si—SiC member has a Young's modulus in a range of 300 to 420 GPa.

12. The laminated member according to claim 1, wherein the Si—SiC member has a content ratio of a metallic Si in a range of 8 to 60 mass %.

13. The laminated member according to claim 1, wherein the resin has a heat resistance temperature in a range of 120 to 300° C.

14. The laminated member according to claim 1, wherein the bonding layer has an average linear expansion coefficient $\gamma$ at 20 to 200° C. in a range of 2 to 200 ppm/° C.

15. The laminated member according to claim 1, wherein the laminated member has a density in a range of 2.40 to 2.85 $g/cm^3$.

16. The laminated member according to claim 1, wherein the laminated member has an amount of bending of 0.25 mm or less.

17. The laminated member according to claim 1, further comprising:
   a second bonding layer lying on the Si—SiC member; and
   a second Si—SiC member bonded to the Si—SiC member via the second bonding layer.

18. The laminated member according to claim 2, wherein the glass member has a composition comprising 55.0 to 85.0 mol % of $SiO_2$, 1.5 to 14.5 mol % of $Al_2O_3$, 3.0 to 14.0 mol % of $B_2O_3$, and 0 to 3.5 mol % of $P_2O_5$, as represented by mole percent based on oxides, and has a total content of the $SiO_2$, the $Al_2O_3$, the $B_2O_3$, and the $P_2O_5$ in a range of 70.0 to 97.0% as represented by mole percent based on oxides.

19. The laminated member according to claim 18, wherein the glass member has a content of the $B_2O_3$ in a range of 8.5 mol % or less.

20. The laminated member according to claim 2, wherein the glass member has a composition comprising 0 to 13.0 mol % of $Na_2O$, as represented by mole percent based on oxides.

* * * * *